(12) United States Patent
Iotti

(10) Patent No.: US 11,808,009 B2
(45) Date of Patent: Nov. 7, 2023

(54) OPERATOR VEHICLE WITH ASSISTED CENTRING DEVICE

(71) Applicant: MANITOU ITALIA S.R.L., Castelfranco Emilia (IT)

(72) Inventor: Marco Iotti, Reggio Emilia (IT)

(73) Assignee: MANITOU ITALIA S.R.L., Castelfranco Emilia (IT)

( * ) Notice: Subject to any disclaimer, the term of this patent is extended or adjusted under 35 U.S.C. 154(b) by 391 days.

(21) Appl. No.: 17/109,702

(22) Filed: Dec. 2, 2020

(65) Prior Publication Data

US 2021/0180290 A1 Jun. 17, 2021

(30) Foreign Application Priority Data

Dec. 16, 2019 (IT) .......................... 102019000024153

(51) Int. Cl.
| | |
|---|---|
| *E02F 9/10* | (2006.01) |
| *B62D 49/06* | (2006.01) |
| *E02F 9/26* | (2006.01) |
| *B66F 9/07* | (2006.01) |

(52) U.S. Cl.
CPC ............ *E02F 9/10* (2013.01); *B62D 49/0614* (2013.01); *E02F 9/26* (2013.01); *B66F 9/07* (2013.01)

(58) Field of Classification Search
CPC .......... E02F 9/10; E02F 9/26; B62D 49/0614; B66F 9/07; B66F 9/0655
See application file for complete search history.

(56) References Cited

U.S. PATENT DOCUMENTS

| | | | |
|---|---|---|---|
| 8,511,490 B2 * | 8/2013 | Kawai | B66C 23/86 212/245 |
| 8,970,363 B2 | 3/2015 | Kraimer et al. | |
| 9,834,908 B2 * | 12/2017 | Iwasaki | E02F 9/2267 |
| 9,878,879 B2 | 1/2018 | Kim | |
| 10,179,723 B2 | 1/2019 | Kraimer et al. | |
| 2011/0118903 A1 | 5/2011 | Kraimer et al. | |
| 2015/0057843 A1 | 2/2015 | Kraimer et al. | |
| 2017/0107081 A1 | 4/2017 | Kim | |
| 2018/0079633 A1 | 3/2018 | Kraimer et al. | |

FOREIGN PATENT DOCUMENTS

| | | |
|---|---|---|
| EP | 3228761 B1 | 10/2019 |
| JP | H05116891 A | 5/1993 |
| RU | 2578649 | 3/2016 |
| RU | 2622435 | 6/2017 |

OTHER PUBLICATIONS

JPH05116891A translate (Year: 1993).*
Russian Office action, dated Mar. 2, 2023, 8 pages.

* cited by examiner

*Primary Examiner* — Tyler J Lee
*Assistant Examiner* — Yufeng Zhang
(74) *Attorney, Agent, or Firm* — Pearne & Gordon LLP; J. Gregory Chrisman

(57) ABSTRACT

Described is an operator vehicle, comprising:
a platform (2), equipped with a seat (3);
a tower (T), coupled to the seat (3) in a rotatable fashion about a main rotation axis;
motor means, arranged to rotate the tower (T) about the main axis;
a detector, arranged to detect the movement of the angular position of the tower towards a reference angular position relative to the main axis, and to emit a corresponding proximity signal.

10 Claims, 3 Drawing Sheets

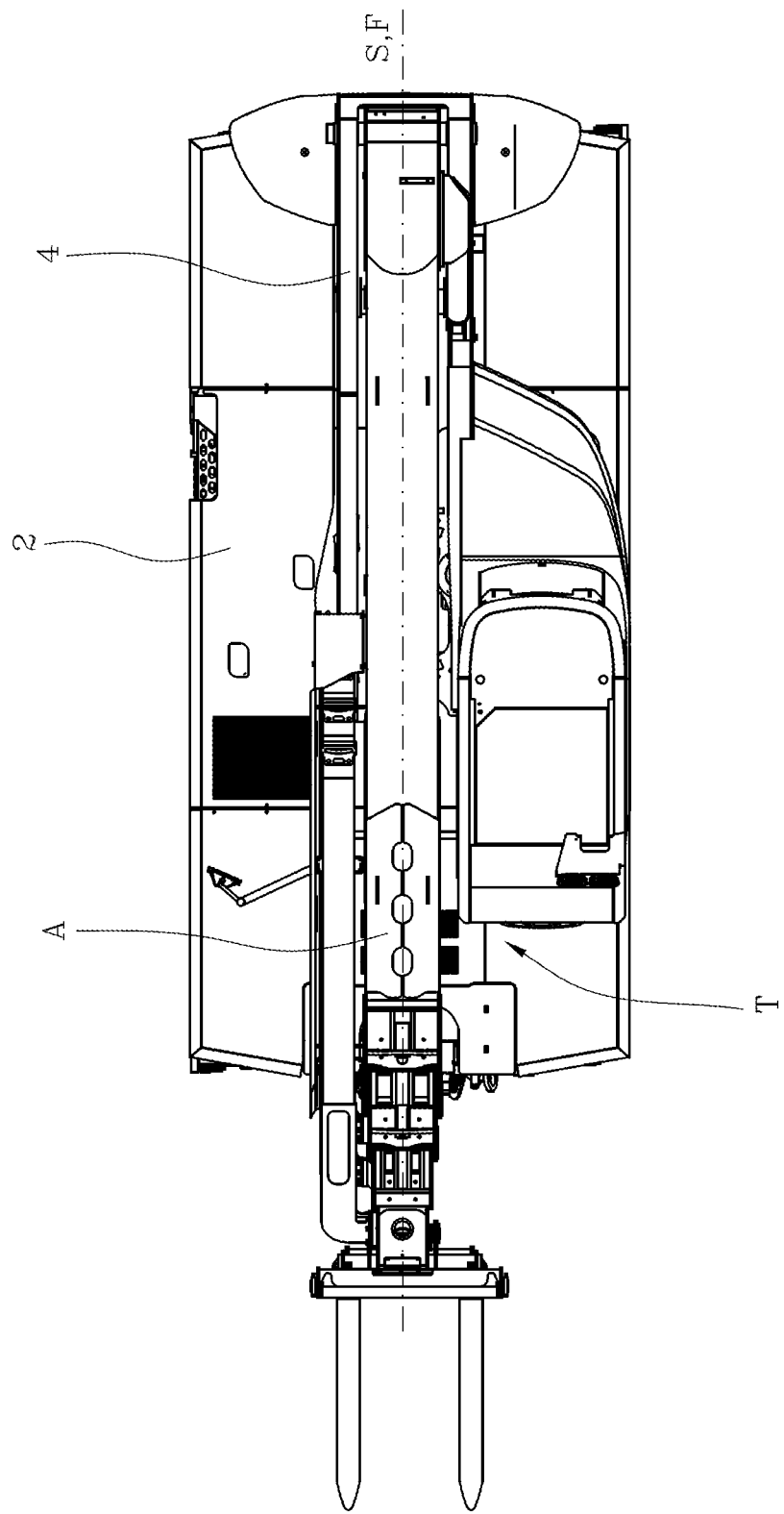

OPERATOR VEHICLE WITH ASSISTED CENTRING DEVICE

This invention relates to an assisted centring device for a tower of an operator vehicle.

In operator vehicles equipped with rotating towers, the tower must be locked in a central position during road travel. Typically, in this central position, the operator arm or the tool supported by the rotating tower faces forwards or backwards, in such a way as not to exceed the overall transversal dimensions of the vehicle.

Currently, the centring of the tower is performed in an empirical manner by the operator, with the aid of sensors which, upon reaching the central position, alert the operator. In short, the operator controls the rotation of the tower towards the central position. Upon reaching the central position, the operator receives a visual signal, for example a warning light.

As it is not possible to instantaneously stop the rotation of the tower upon receiving the signal, the operator exceeds the central position, and is therefore forced to correct the position of the tower several times, reversing the rotation. It is therefore a rather laborious and inefficient procedure. Moreover, in the current vehicles, once the central position of the tower has been reached, the operator must manually activate a locking device, to prevent the tower from abandoning the central position due to inertial loads due to the driving of the vehicle.

The aim of the invention is to overcome the above-mentioned drawbacks, by providing an operator vehicle, equipped with a rotating tower, for which the positioning of the tower and the locking of the tower in the central position is simple, rapid and precise.

Further features and advantages of the invention are more apparent from the detailed description which follows of an embodiment of the invention, illustrated by way of a non-limiting example in the accompanying drawings in which:

FIG. 3 shows the vehicle of FIG. 2, with the tower in a central position.

Figure 1:
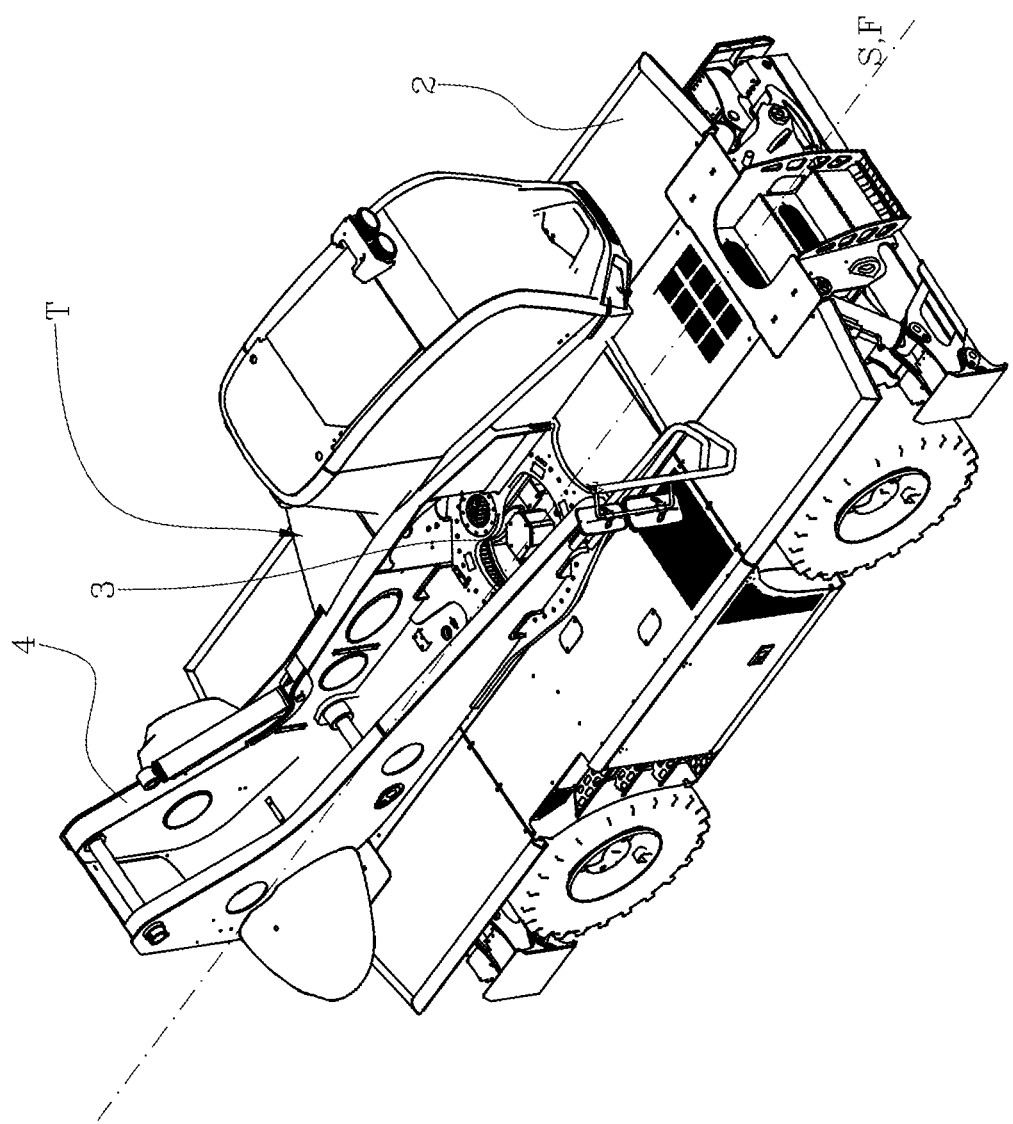
FIG. 1 is an isometric view of an operator vehicle according to the invention.
Figure 2:
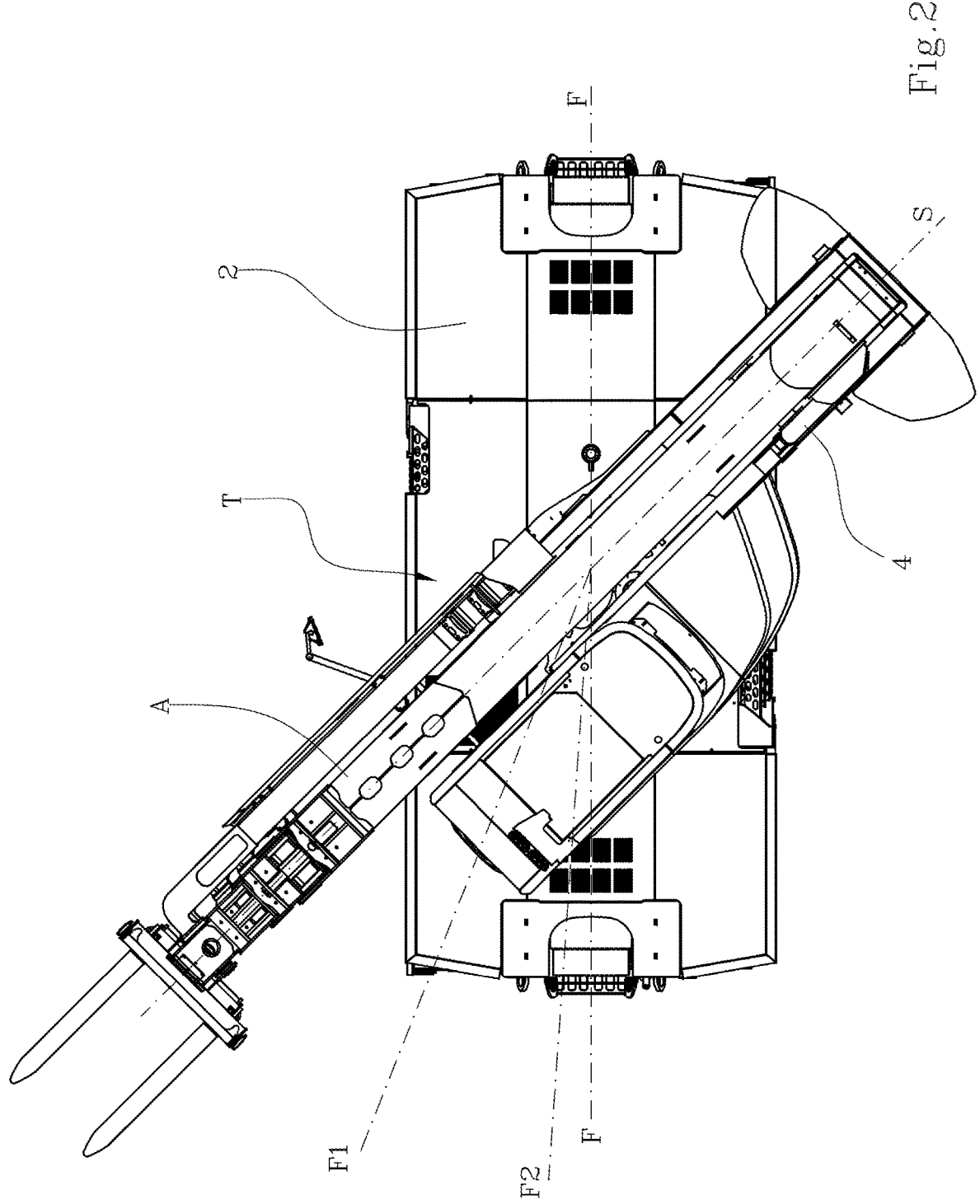
FIG. 2 is a top view of the vehicle of FIG. 1, equipped with an arm and with the tower in a rotated position.

The operator vehicle comprises a platform (2). In short, the platform (2) is the part of the vehicle which comprises the load-bearing frame, to which the wheels, the engine and other devices for driving and controlling the vehicle are associated. Depending on the type of vehicle, the size and the tools carried, the platform (2) has different features, known in the sector.

The platform (2) comprises a seat (3) arranged to couple with a coupling part (4) of the tower (T), in a rotatable fashion about a main rotation axis. For example, the main axis is perpendicular to the supporting surface of the vehicle, that is to say, the supporting surface of the wheels is perpendicular.

According to the embodiment illustrated, the coupling part (4) defined by the rear portion of the tower (T) is the lower support of a telescopic arm (A), equipped with two or more extendable sliding members. The telescopic arm (A) is also provided with the possibility of rotating relative to the coupling part (4) about an rotation axis perpendicular to the main axis. The tower (T) also supports the driver's cab of the vehicle.

Motor means, of type known in the sector, are arranged to rotate the tower (T) about the main axis; To favour the rotation of the tower (T), between the latter and the seat (3) rotatable coupling means are provided, for example a rack known in the trade. The motor means comprise, for example, a hydraulic motor or an electric motor.

The vehicle according to the invention comprises a detector, arranged to detect the movement of the angular position of the tower (T) towards a reference angular position relative to the main axis, and to emit a corresponding proximity signal.

According to the embodiment illustrated, the reference angular position corresponds substantially to an angular position in which a longitudinal axis (S) of the tower (T) is parallel to the direction of travel (F) of the vehicle. For example, the reference angular position is the central position of the tower (T), that is to say, of the coupling part (4). In that position, the driver's cab faces forwards, in the direction of travel (F), and the arm (A) is positioned parallel to the direction of travel (F). Obviously, in other vehicles, the reference angular position may be referred to different axes and directions, depending on the shape of the vehicle and of the tool supported. One skilled in the trade is able to select the reference axes or directions according to requirements.

The detector may consist of or comprise any sensor (or plurality of sensors), capable of detecting the angular position of the tower (T), such as, for example, and without limiting the scope of the invention, a proximity sensor, associated with the tower or the seat (3) or with the platform (2) or an encoder or any other sensor suitable for the purpose. If the proximity sensor is used, a reference part can, if necessary, according to a possible embodiment, be associated with the tower (T), with the seat (3) or with the platform (2) to interact with the proximity sensor, in a position signifying the reference angular position. For example, the reference part may be integral with the seat (3), whilst the proximity sensor may be associated with the tower (T), or vice versa. Instead of the seat (3), the proximity sensor or the reference part could be associated with the platform (2).

The detector is configured to detect and signal the approach to the reference angular position starting from a predetermined initial angle. In other words, according to the embodiment illustrated, the detector signals the approach to the reference angular position when the angle formed between the longitudinal axis (S) of the tower (T) (in detail, of the main base structure of the tower (T) with bears the above-mentioned coupling part (4) at the rear) and the feed direction (F) falls below a predetermined initial angle.

When it detects the approach to the reference angular position, the detector sends a corresponding proximity signal which may be configured in such a way as to vary with the reduction in the angle between the angular position of the coupling part (4) and the reference angular position. This signal may be communicated in a visual or acoustic manner to the operator who, by rotating the tower (T), may slow down and consequently stop the rotation once the reference angular position is reached. The exact reaching of the reference angular position may be signalled in a specific and different manner with respect to the proximity signal. For example, the signal is transmitted to the operator in a variable form when the central position is approached. In the case of an acoustic signal, the signal may vary its intensity and/or frequency when the central position is approached. In the case of a visual signal, the signal may vary in colour and/or shape when the central position is approached.

For example, the frequency of the acoustic signal may increase progressively with the approach towards the centred position of the tower (T), if necessary until becoming continuous when the angle falls below a predetermined proximity threshold and the visual signal may be an index represented on a display, the colour and/or shape of which change progressively in proportion to the degree of vicinity to the centring condition, such as a series of bars of different heights, or a bar which changes in length and colour and so on.

Thanks to the presence of the detector, the manoeuvre for finding the reference angular position of the tower (T) is thus made more precise and easier.

According to a possible embodiment, the vehicle is equipped with a control module, connected to the motor means to adjust and control the operation.

According to a manner known in the sector, the control module mentioned in this description and in the subsequent claims is indicated generically as a single unit, but in effect it may be equipped with separate functional modules (memory modules or operating modules), each designed for controlling a predetermined device of the operator vehicle and/or for a cycle of operations. For example, in addition to the motor means, the control module is designed for controlling the pumps and actuators present on board the vehicle, as well as the main motor of the vehicle. In short, the control module may consist of a single electronic device, programmed to perform the functions described, and the various functional modules can correspond to hardware units and/or software routines forming part of the programmed device. Alternatively or in addition, the functions can be performed by a plurality of electronic devices on which the above-mentioned functional modules can be distributed. The processing units may also have one or more processors for the execution of the instructions contained in the memory modules. The units and the above-mentioned functional modules may also be distributed on different computes, either locally or remotely, on the basis of the architecture of the network on which they are housed.

The control module is configured to receive the proximity signal emitted by the detector and to control the drive of the motor means as a function of the proximity signal received.

According to a possible embodiment, the control module is arranged to slow down the rotation produced by the motor means upon receiving the proximity signal emitted by the detector. In that case, the operator need not vary his/her action on the rotation commands of the tower to slow down the rotation, but the control module acts directly on the motor means to slow the rotation of the tower.

According to the above-mentioned embodiment, the detector is substantially arranged to detect at least a first approaching position (F1), separated by a first operating angle relative to the reference angular position. The control module is arranged to slow down the rotation produced by the motor means upon receiving the proximity signal at the first approaching position. The stopping of the rotation could be controlled by the operator, by means of the commands at his/her disposal, or by the control module, at the reference angular position.

According to a further possible embodiment, the control module is arranged to stop the rotation produced by the motor means upon receiving the proximity signal emitted by the detector. In that case, the first approaching position is very close to the reference angular position. In this case, too, the operator need not vary his/her action on the rotation commands of the tower to stop the rotation, but the control module acts directly on the motor means to stop the rotation of the tower.

According to a particular embodiment, the detector is arranged to detect at least a first approaching position, separated by a first operating angle relative to the reference angular position, and at least a second approaching position, separated by the reference angular position by a second operating angle, less than the first operating angle. According to this embodiment, the control module is arranged to slow down the rotation produced by the motor means upon receiving the proximity signal at the first approaching position, and to stop the rotation produced by the motor means upon receiving the proximity signal at the second approaching position. In that case, the second approaching position is very close to or coincident with the reference angular position.

According to a possible embodiment, the control module is arranged to autonomously activate the motor means, after a corresponding command, for positioning the tower (T) in the reference angular position. In short, the control module is equipped with an algorithm which, after receiving a command from the operator, activates the motor means for rotating the coupling part in the reference angular position, using the sensor according to the methods described above.

The invention, both in the manual version and in the automatic version, constitutes an aid for the operator for centring the tower (T), that is to say, its alignment with the axis (S) of the chassis of the vehicle, for any type of use or aim, whether it is required by the working operations or for road transport, described, by way of example, during the discussion of the prior art.

The operator vehicle according to the invention may also be equipped with an automatic locking device, for locking the tower (T) in the reference angular position.

The locking device, known in its general structure to an expert in the trade, is equipped with an actuator connected to the control module. The actuator is controlled by the control module to adopt an operating configuration, in which it actuates the locking device in an active position, for locking the tower (T) in the reference angular position, and a non-operating configuration, in which it actuates the locking device in an inactive position, for freeing the tower (T) relative to the rotation about the main axis.

The control module is configured for activating the locking device in the active position, after a command, when the tower (T) is in the reference angular position and it is stationary. The control module moves the locking device to the inactive position when it receives a command for rotation of the tower (T) from the operator.

The invention claimed is:
1. An operator vehicle, comprising:
a platform, equipped with a seat;
a rotating tower, coupled to the seat in a rotatable fashion about a main rotation axis;
motor means, arranged to determine a rotation of the rotating tower about the main rotation axis;
a detector, arranged to detect a movement of an angular position of the rotating tower towards a reference angular position relative to the main rotation axis, and to emit a corresponding proximity signal; and
a control module, configured to receive the corresponding proximity signal emitted by the detector and to control a drive of the motor means as a function of the corresponding proximity signal received, wherein
the detector is arranged to detect at least a first approaching position, separated by a first operating angle relative to the reference angular position, and at least a second approaching position, separated by the reference angular position by a second operating angle, less than the first operating angle; and the control module is arranged to slow down the rotation produced by the motor means upon receiving the corresponding proximity signal at the first approaching position, and to stop the rotation produced by the motor means upon receiving the corresponding proximity signal at the second approaching position.

2. The operator vehicle according to claim 1, wherein the control module is arranged to slow down the rotation produced by the motor means upon receiving the corresponding proximity signal emitted by the detector.

3. The operator vehicle according to claim 1, wherein the control module is arranged to stop the rotation produced by the motor means upon receiving the corresponding proximity signal emitted by the detector.

4. The operator vehicle according to claim 1, wherein:
the detector is arranged to detect at least a first approaching position, separated by a first operating angle relative to the reference angular position;
the control module is arranged to slow down or stop the rotation produced by the motor means upon receiving the corresponding proximity signal at the first approaching position.

5. The operator vehicle according to claim 1, wherein the control module is arranged to independently activate the motor means, after a corresponding command, for positioning a coupling part in the reference angular position.

6. The operator vehicle according to claim 1, wherein the detector comprises at least one proximity sensor, associated with the rotating tower or with the seat or with the platform.

7. The operator vehicle according to claim 1, wherein the control module is arranged to independently activate the motor means, after a corresponding command, for positioning the rotating tower in the reference angular position.

8. The operator vehicle according to claim 6, wherein the control module is equipped with an algorithm which, after receiving a command from an operator, activates the motor means for rotating a coupling part in the reference angular position, using the proximity sensor.

9. The operator vehicle according to claim 1, comprising an automatic locking device, designed for locking the rotating tower in the reference angular position.

10. The operator vehicle according to claim 9, wherein the automatic locking device is equipped with an actuator connected to the control module, and wherein the actuator is controlled by the control module to adopt an operating configuration, in which it actuates the automatic locking device in an active position, for locking the rotating tower in the reference angular position, and a non-operating configuration, in which it actuates the automatic locking device in an inactive position, for freeing the rotating tower relative to the rotation about the main rotation axis.

* * * * *